US012399693B1

(12) United States Patent
Pohlack et al.

(10) Patent No.: US 12,399,693 B1
(45) Date of Patent: Aug. 26, 2025

(54) GUIDED DYNAMIC ANALYSIS OF CODE WITH STATIC CODE ANALYSIS

(71) Applicant: Amazon Technologies, Inc., Seattle, WA (US)

(72) Inventors: Martin Pohlack, Dresden (DE); Bjoern Doebel, Dresden (DE); Norbert Manthey, Dresden (DE)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 17/447,492

(22) Filed: Sep. 13, 2021

(51) Int. Cl.
*G06F 21/57* (2013.01)
*G06F 8/41* (2018.01)
*G06F 9/54* (2006.01)
*G06F 11/3668* (2025.01)

(52) U.S. Cl.
CPC ............ *G06F 8/44* (2013.01); *G06F 21/577* (2013.01); *G06F 11/3688* (2013.01); *G06F 2221/033* (2013.01)

(58) Field of Classification Search
CPC ................................ G06F 8/44; G06F 21/577
USPC .......................................................... 726/25
See application file for complete search history.

(56) References Cited

U.S. PATENT DOCUMENTS

| | | | |
|---|---|---|---|
| 8,856,869 B1 * | 10/2014 | Brinskelle | H04L 63/0823 726/2 |
| 8,918,768 B2 * | 12/2014 | Chevallier-Mames | G06F 21/14 717/151 |
| 11,200,151 B1 * | 12/2021 | Cates | G06F 11/3624 |
| 2013/0174258 A1 * | 7/2013 | Livshits | G06F 21/566 717/131 |
| 2013/0340977 A1 * | 12/2013 | Singleton | F28D 15/02 165/104.11 |
| 2013/0343377 A1 * | 12/2013 | Stroud | H04L 45/7453 370/389 |
| 2013/0346756 A1 * | 12/2013 | Cook | G06F 21/00 711/E12.001 |

(Continued)

FOREIGN PATENT DOCUMENTS

| | | | | |
|---|---|---|---|---|
| CN | 111858358 A | * | 10/2020 | .......... G06F 11/3672 |
| EP | 3770766 A1 | * | 1/2021 | .......... G06F 11/0772 |
| JP | 2016110330 A | * | 6/2016 | |

OTHER PUBLICATIONS

JP-2016110330-A in English (Year: 2016), Change Influence Analysis Device and Change Influence Analysis Method and Program, Gondo et al., pp. 1-11.*

*Primary Examiner* — Haresh N Patel
(74) *Attorney, Agent, or Firm* — Knobbe, Martens, Olson & Bear, LLP

(57) ABSTRACT

Targeted dynamic analysis of code is provided by utilizing static analysis and dynamic analysis. A static code analysis system can operate to generate an initial analysis of code. The results of the initial analysis may be used to target a dynamic analysis system to analyze portions of code identified by the static analysis as potentially containing defects. In some cases, a preliminary dynamic analysis may be used to generate code inputs that may be utilized in future analyses to determine the inputs necessary to target particular code paths identified by a static analysis as potentially defective. Future updates to the code base may utilize the generated data to target analysis to code paths affected by the updates.

20 Claims, 6 Drawing Sheets

(56) References Cited

U.S. PATENT DOCUMENTS

| | | | | |
|---|---|---|---|---|
| 2013/0346814 | A1* | 12/2013 | Zadigian | G01R 31/318536 |
| | | | | 714/724 |
| 2018/0052676 | A1* | 2/2018 | Charters | G06F 8/65 |
| 2020/0380160 | A1* | 12/2020 | Kraus | G06F 21/577 |
| 2020/0394311 | A1* | 12/2020 | Li | G06F 21/563 |
| 2021/0029108 | A1* | 1/2021 | Obando Chacon | G06F 21/604 |
| 2021/0089138 | A1* | 3/2021 | Imms | G06F 13/107 |
| 2021/0097168 | A1* | 4/2021 | Patel | G06F 21/554 |
| 2021/0409432 | A1* | 12/2021 | Reardon | H04L 63/1425 |
| 2022/0014561 | A1* | 1/2022 | Caceres | G06F 16/951 |
| 2022/0229705 | A1* | 7/2022 | Mody | G06F 9/5077 |
| 2022/0392420 | A1* | 12/2022 | Harwell | G09G 5/06 |

\* cited by examiner

GUIDED DYNAMIC ANALYSIS OF CODE WITH STATIC CODE ANALYSIS

BACKGROUND

Code analysis can reduce software defects by automating the review of computer code. In code analysis, dynamic analysis refers to analysis techniques that are applied to executable code during or following execution. By contrast, static analysis refers to analysis techniques that are applied to source code or executable code at rest. Static analysis is generally quick to perform, and can be routinely automated. Some static analysis systems provide for integration into continuous integration and deployment pipelines, allowing developers to automatically analyze code as it is published to the developers' code repository. Dynamic analysis methods may require additional setup and configuration by a developer or administrator, but may be able to uncover defects missed by a static analysis. Fuzzing, for example, can be used to generate random or semi-random inputs to an executable code in order to identify defects that are difficult to spot by manual or automated scanning of code.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
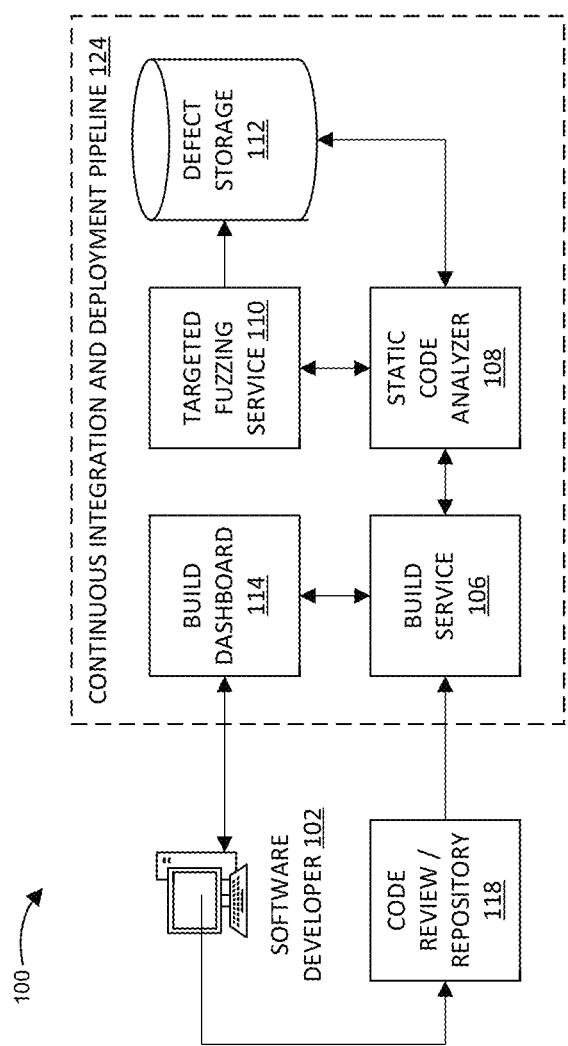
FIG. 1 is a block diagram of an example computing environment for providing guided dynamic analysis using the results of static analysis within a continuous integration and deployment pipeline.

Generally described, the present disclosure relates to systems and methods for efficient, automated detection of code defects using guided dynamic code analysis. In some cases, the guided dynamic code analysis is supplemented with or triggered by static code analysis. A static analysis system can be configured to analyze source code and/or executable code to identify defects in the code without executing it. A dynamic analysis system can be configured to execute an executable code in order to identify defects in the code. In dynamic analysis, the execution of the code can be directed to invoke particular execution paths by providing the executable code with specific inputs. Guided dynamic analysis uses external or supplemental information to identify specific execution paths that should be analyzed.

Conventionally, static code analysis is performed by a developer or system to analyze code for defects before it is put into operation to supplement or replace human review of code. In a typical example, a developer may run a static code analyzer over a source code file or an executable code generated from a source code file to generate a report listing any identified defects. Analysis techniques employed by such an analyzer may include scanning code for patterns of logic or syntax that match known security vulnerabilities or other code defects. The patterns used may be updated from time to time as new vulnerabilities or defects are discovered and reported. For developers or organizations making frequent updates to a large code base, the process of analyzing the code with every change may be cumbersome and time-consuming if performed manually. To mitigate this, static code analysis may be integrated into a continuous integration and deployment (CICD) pipeline. In these systems, the static analysis may be performed by an analysis engine or module that is automatically invoked when a developer publishes a code change to a code review and repository module that stores the code, and the system may prevent creation of a new build or version of the software until any defects identified by the static analysis module are remedied, obviating the need for the developer to run an analysis manually or keep track of whether a code change from another developer has been analyzed. Static analyzers, however, cannot identify all possible code defects. Further, the more sensitive an analyzer is, the more prone it may be to generating "false positives," which may occur where the static code analyzer has identified a defect in code that isn't actually defective. This may be undesirable, as large numbers of false positives may be time-consuming for developers to investigate and flag, and further as it may cause developers to begin ignoring identified issues under the assumption that the issues are likely to be false positives.

Dynamic code analysis identifies defects in code by executing code and observing its execution. It may be desirable to identify code defects for which there are currently no known patterns or that are otherwise difficult to identify by inspection of the code at rest. A dynamic code analyzer may include a fuzzing component or "fuzzer," which can be a program configured to provide an executable code with a series of random or semi-random inputs in order to identify code defects that may be triggered by particular inputs. By virtue of testing random or unusual inputs, these programs can provide the benefit of revealing defects in unexpected or overlooked segments of code that might not be triggered by normal interactions. For example, a fuzzer may test a photo viewing program by feeding it successive variations of an image file containing data patterns that would not normally be generated by a camera or image manipulation program, such as malformed header information or metadata that does not conform to the image specification. More complex fuzzers may be configured to identify the particular execution path that the executable code traverses when it is given particular inputs. Such "guided" fuzzers may be further configured to generate guidance data that may take the form of a code coverage map or input map that maps the inputs given to the executable to the resulting execution path. The map may be developed over several executions of the code with varying inputs in order to achieve "coverage" of as large as possible a fraction of the possible execution paths the executable code may take, guiding the fuzzer along successive execution paths by reusing inputs it has previously mapped to prior execution steps in the desired path. For example, in order to test a first function that is only called by a second function, the fuzzer may perform a lookup on its input map to identify inputs that are known to cause execution to reach the second function, and then vary the further inputs until an input is identified that will cause subsequent execution of the first function, at which point it may store the inputs and corresponding execution path in the input map. This approach can be extremely time- and resource-consuming, requiring both time and computing power to process each successive execution of the executable code, which may render it impractical for use with large or frequently-modified codebases.

Some aspects of the present disclosure address some or all of the problems noted above, among others, by combining static and dynamic analysis. In this approach, a static analysis is performed on code, the results of which are used to guide a dynamic analysis of the code. This facilitates the automatic reduction or elimination of false positives from the static analysis by using the dynamic analysis to corroborate the existence of potential defects in particular code paths. For example, a new code publication may be flagged as containing a set of potential security vulnerabilities associated with one or more functions, and a subsequent dynamic analysis may further identify code defects present in one or more of the same functions, providing a basis for alerting on the corroborated subset of code defects to be confirmed by developers. Conversely, the dynamic analysis may show no defects in one or more of the identified functions, and the system may flag the subset of uncorroborated defects as likely false positives.

Additional aspects of the present disclosure relate to determining which portions of executable code have been changed, so as to focus testing (e.g., time and resources devoted to static and/or dynamic analysis) on those changed portions. To determine which portions of the executable code have changed and ensure coverage of those portions in the dynamic analysis process, a comparison of programmatic changes at the level of binary executable code level can be performed. In some embodiments, executable code from a prior version of an application or system under review is compared to executable code of a current version of the application or system under review. Differences in the executable code reflect the changes made to the prior version. Execution paths that include those changed portions of the executable code can be determined using static code analysis and/or dynamic analysis. Analysis of defects identified in those execution paths can be prioritized over other defects, such as defects previously identified in the prior version as false positives.

Additional aspects of the present disclosure relate to using static analysis to improve the efficiency of dynamic analysis. In some embodiments, an initial dynamic analysis of the code base may be performed to generate guidance data in the form of an input map with a wide coverage of the code. For example, the input map can store mappings of inputs used by a fuzzer to cause execution of particular functions and executions paths. In these embodiments, subsequent updates to the code base may trigger a static analysis that identifies defects in the changed code. Instead of running a complete dynamic analysis, the input map and/or other results of the static analysis may be used to guide the dynamic analysis to prioritize or cover only those segments of code for which defects have been identified, reducing both the computational and time cost of the dynamic analysis. Alternatively, some embodiments may skip initial dynamic analysis, and may instead be guided to develop code coverage only of execution paths that have been identified by a static analysis as potentially containing defects.

Various aspects of the disclosure will now be described with regard to certain examples and embodiments, which are intended to illustrate but not limit the disclosure. Although aspects of some embodiments described in the disclosure will focus, for the purpose of illustration, on particular examples of code development systems, code defects, and code analysis operations, the examples are illustrative only and are not intended to be limiting. In some embodiments, the techniques described herein may be applied to additional or code development systems, code defects, code analysis operations, and the like.

Overview of Example Computing Environment

With reference to an illustrative embodiment, FIG. 1 shows an example computing environment 100 in which features of the present disclosure may be implemented. In some embodiments, as shown, the computing environment 100 may include a continuous integration and deployment (CICD) pipeline 124 and a software developer 102. The continuous integration and deployment pipeline 124 and the software developer 102 may communicate with each other via one or more communication networks. In some embodiments, a communication network (also referred to simply as a "network") may be a publicly-accessible network of linked networks, possibly operated by various distinct parties, such as the Internet. In some cases, the network may be or include a private network, personal area network, local area network, wide area network, global area network, cable network, satellite network, cellular data network, etc., or a combination thereof, some or all of which may or may not have access to and/or from the Internet.

The CICD pipeline 124 may include various components to provide build services to the software developer 102. As shown, the CICD pipeline 124 may include a build service 106, a static code analyzer 108, a targeted fuzzing service 110, a defect storage 112, and a build dashboard 114. A code review and repository module 118 may be part of the CICD pipeline 124, or may be separate from the CICD pipeline 124 as shown.

The CICD pipeline 124 (or individual components thereof, such as the build service 106, static code analyzer 108, targeted fuzzing service 110, defect storage 112, build dashboard 114, code review and repository module 118, etc.) may be implemented on one or more physical server computing devices. In some embodiments, the CICD pipeline 124 (or individual components thereof) may be implemented on one or more host devices, such as blade servers, midrange computing devices, mainframe computers, desktop computers, or any other computing device configured to provide computing services and resources. For example, a single host device may execute one or more build services 106, static code analyzers 108, targeted fuzzing services 110, defect storages 112, build dashboards 114, code repositories 118, some combination thereof, etc. The CICD pipeline 124 may include any number of such hosts.

In some embodiments, the features and services provided by the CICD pipeline 124 may be implemented as web services consumable via one or more communication networks. In further embodiments, the CICD pipeline 124 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may be provided by a cloud provider network.

A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. A physical or infrastructure availability zone (also known as an availability domain, or simply a "zone") refers to an isolated failure domain including one or more data center facilities with separate power, separate networking, and separate cooling from those in another availability zone. Preferably, physical availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

The code review and repository module 118 may receive code updates from one or more software developers 102, and may store the updates for later retrieval by a software developer 102 and/or a build service 106. The code repository may be a simple file store, or it may be a version control repository such as GIT, SVN, RCS, CVS, etc.

The build service 106 may manage the generation of "builds" of executable code from source code contained in the code review and repository module 118. As shown in FIG. 1, in some embodiments, the build service 106 may poll the code repository periodically to identify and retrieve changes to the code base. Additionally, or alternatively, the build service 106 may be configured to retrieve the current state of the code review and repository module 118 by a software developer 102 issuing a request via the build dashboard 114. In some embodiments, when the build service 106 detects a change to the code base, it may be configured to trigger an analysis of the code. In these embodiments, the build service may generate a "test" build of executable code from the source code to facilitate analysis by the static code analyzer 108 and the targeted fuzzing service 110. To facilitate analysis, in some embodiments the build service 106 may deliver a copy of the source code and the executable code to the static code analyzer 108. Additionally, or alternatively, the build service 106 may be configured to communicate only the portions of code that changed with the update. The build service 106 may be further configured to receive analysis results from the static code analyzer 108. In these embodiments, the build service may base a determination of whether to publish a build on the analysis results. For example, an analysis result may indicate a potential security vulnerability detected by the static code analyzer 108 and corroborated by the targeted fuzzing service 110, and the build service 106 may decline to publish a build of the executable code until the vulnerability is eliminated or manually flagged as a false positive.

The build dashboard 114 may comprise an interface through which a software developer 102 may interact with the build service 106. In some embodiments, the build dashboard 114 may be a web interface of the build service 106, or it may be an external program or web interface connected to the build service via a network. In an example embodiment, the build dashboard 114 may be used to receive information about a code update, including the status of any builds, errors encountered during the build process, and/or analysis results indicating code defects. In these embodiments, the user may be able to flag an identified defect as a false positive and continue a stopped build. In environments with multiple software developers 102, the build dashboard may be configurable to require another software developer, such as a peer or a manager, to approve flagging of defects as false positives. In some embodiments, a software developer 102 may be able to use the build dashboard 114 to trigger a build and/or an analysis.

FIG. 1 depicts the build service 106 as connected to a static code analyzer 108. The static code analyzer 108 may employ a number of analysis techniques and technologies. For example, the static code analyzer may include a commercial or open source code analysis tool, such as Coverity, Codacy, GitLab, LGTM, etc. The static code analyzer 108 may be configured to receive source code and/or executable code from a build service 106 and analyze the code for defects. Additionally, or alternatively, the static code analyzer 108 may receive code directly from a software developer 102, or retrieve code from code review and repository module 118 in response to a request to analyze the code. In some embodiments, the static code analyzer 108 may be configured to analyze a complete copy of a source or executable code, or it may be configured to analyze only the code that has changed between the current and previous versions of the codebase. As shown in FIG. 1, the static code analyzer 108 is connected to a defect storage 112. In these embodiments, the static code analyzer 108 may store a record of any defects identified during analysis in the defect storage 112.

In some embodiments, the static code analyzer 108 may be configured to further store metadata related to identified defects, such as code paths and/or execution paths associated with the defects, information about defect severity, which version of the code the defect was identified from, etc. For example, the static code analyzer 108 may receive a source code file and a corresponding executable code file, in which it detects a potential security vulnerability in a function defined in the source code file. The static code analyzer may store information about the defect, including a defect ID corresponding to the type of defect, and indicate the severity of the defect based on predefined criteria, such as the nature of the vulnerability, predicted ease of exploitation, and/or a confidence rating. In addition, the static code analyzer may store the filename of the source code file, the line numbers of the source code corresponding to the function, and an identifier of the function, such as the function name. The static code analyzer may further determine, based on analysis of the executable code such as scanning instrumentation or debug information contained within the executable code, the code paths of the executable code that correspond to the identified function, and may store these code paths as sequences of function identifiers that can be executed to reach the affected function.

As shown in FIG. 1, the static code analyzer 108 is additionally connected to a targeted fuzzing service 110. The targeted fuzzing service may employ any of a number of commercial or open source fuzzers, such as American fuzzy lop ("AFL"), jsfuzz, Javafuzz, libFuzzer, etc. The targeted fuzzing service 110 may be configured to analyze executable code generated by the build service 106. In some embodiments, the executable code may be a test build containing instrumentation and additional information to assist in guiding the fuzzing process, such as debug information, function tags, breakpoints, and/or API information. In some embodiments, the targeted fuzzing service may be further configured to receive source code corresponding to an executable code to aid analysis. The targeted fuzzing service 110 may be configured to analyze only portions of an executable code. In these embodiments, the targeted fuzzing service 110 may be further configured to receive code paths or execution paths to target for analysis. Additionally, or alternatively, the targeted fuzzing service 110 may receive a report of potential defects associated with a code, and may identify a plurality of target execution paths corresponding to the potential defects.

FIG. 1 further depicts the targeted fuzzing service 110 in connection with defect storage 112. In some embodiments, the targeted fuzzing service 110 may store identified code defects in defect storage 112. In some embodiments, the targeted fuzzing service 110 may be configured to further store metadata related to identified defects, such as code paths and/or execution paths associated with the defects, information about defect severity, which version of the code the defect was identified from, etc. For example, each code path may be a sequence of identifiers each corresponding to a function within the source code corresponding to the executable code. In some embodiments, the code paths may indicate branches within the executable code that were followed during execution when the defect was triggered. The targeted fuzzing service 110 may also store both the execution path that triggered the vulnerability and the portions of the source code that correspond to the execution path, and may cross-reference identifiers to indicate which elements of the executable code correspond to particular elements of the source code. The nature of the defect may comprise an identifier indicating how the defect was triggered, how the executable behaved, etc. For example, a buffer overflow defect may be triggered by providing an input of greater length than an executable code expects, causing the program to crash; the targeted fuzzing service 110 may select a "buffer overflow vulnerability" based on the input being user-configurable, the execution resulting in a crash, and the behavior before the crash, such as the program overwriting an executable portion of the stack with the input. The defect may be stored with the input that triggered it, the execution path that was followed, and the lines of source code that generated the execution path. Additionally, or alternatively, the targeted fuzzing service 110 may return a report of identified defects to static code analyzer 108.

Example Initial Code Analysis

Figure 2:
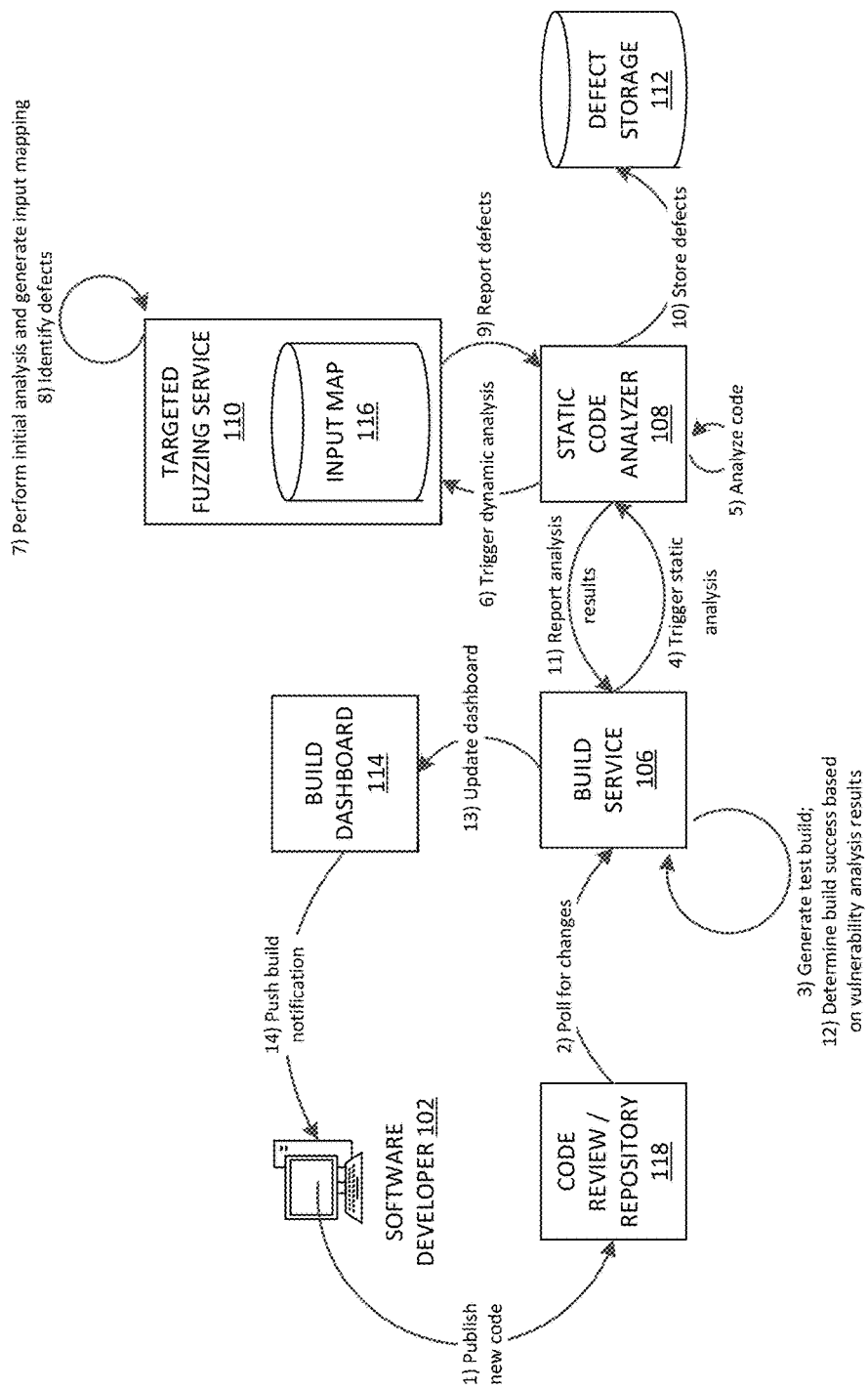
FIG. 2 is a block diagram of illustrative data flows and interactions between components of an example system for generating an initial analysis of a new code base.

With respect to FIG. 2, illustrative interactions are depicted for performing an initial analysis of a new code, including the development of guidance data in the form of an input map by a targeted fuzzing service. The interactions begin at (1), where a software developer 102 publishes new code to code review and repository module 118.

At (2), build service 106 polls the code review and repository module 118 for changes to the codebase, and pulls in the new code. In other embodiments, the code review and repository module 118 may be configured to notify the build service 106 of code changes. Alternatively, or additionally, a user may trigger the build service 106 to poll the code review and repository module 118 through interactions with the build dashboard 114. For example, a user may publish a code file, and using build dashboard 114, configure a build process for the new code on build service 106.

At (3), the build service 106 generates a test build of the code. In some embodiments, this may comprise compiling an executable code from the source code published at (1). In these embodiments, the test build may be further configured to include debug information or "function hooks" that improve the ability of analysis tools to trace the resulting executable code. Additionally, or alternatively, the test build may comprise a code package, such as a python package, javascript library, etc. At (4), the build service 106 triggers the static code analyzer 108 to perform a static analysis of the code.

At (5), the static code analyzer analyzes the code. In some embodiments, analysis may be limited to the source code. Additionally, or alternatively, the static code analyzer may analyze the executable code or code package generated by the build service 106. The static code analyzer may comprise one or more analysis programs or modules designed to inspect code for defects. For example, the static code analyzer may include a program designed to inspect source code for common security vulnerabilities, such as memory leaks or buffer overflows. The identified defects may be associated with code paths of the source code. Additionally, or alternatively, the defects may be associated with execution paths of an executable code corresponding to the source code. For example, the static code analyzer 108 may be configured to request an analysis from the targeted fuzzing service 110 with a communication comprising a list of defects, the source code line numbers the defects are associated with, and a copy of the source code and a corresponding executable code.

At (6), the static code analyzer 108 triggers the targeted fuzzing service 110 to perform a dynamic analysis. In some embodiments, the static code analyzer 108 may provide the targeted fuzzing service 110 with the executable code and/or the source code. Additionally, or alternatively, the targeted fuzzing service 110 may retrieve the code from the build service 106 and/or the code review and repository module 118.

At (7), the targeted fuzzing service 110 performs an initial analysis and generates an input mapping. In some embodiments, the dynamic analysis may be performed simultaneously with the static analysis. In other embodiments, the results of the static analysis may be provided to the targeted fuzzing service 110. In these embodiments, the targeted fuzzing service may guide execution of the executable code to ensure coverage of execution paths associated with potential defects discovered by the static code analyzer 108. For example, the static code analyzer 108 may be configured to request an analysis from the targeted fuzzing service 110 with a communication comprising a list of defects, the source code line numbers the defects are associated with, and a copy of the source code and a corresponding executable code. The targeted fuzzer may generate progressive inputs to trigger execution of areas of executable code corresponding to the areas of source code identified by the static code analyzer 108 to be associated with potential defects. Additionally, or alternatively, the targeted fuzzing service 110 may be configured to maximize the possible execution paths tested, in order to generate maximum code coverage. As discussed in more detail below, the targeted fuzzing service 110 may generate a map of inputs and associated execution paths as it analyzes the code. In some embodiments, the targeted fuzzing service 110 may store the resulting map as input map 116 for future analysis. For example, an executable code may contain functions A, B, and C, and the targeted fuzzing service may discover that C is reachable from B with input x, that B is reachable from A with input y, and that A may be triggered from the beginning of execution with input z; the targeted fuzzing service may then store a mapping of the input sequence z-y-x, to the code path A-B-C. As the targeted fuzzing service 110 performs successive executions of the executable code with varying inputs, it may be configured to identify code defects that are triggered by the execution. For example, a particular input to an executable code may cause the code to crash or generate an error. In some embodiments, the targeted fuzzing service may be configured to note the defect, the execution path that led to it, and the input that caused execution of the execution path.

At (8), the targeted fuzzing service 110 analyzes the executable code to identify defects. In some embodiments, the targeted fuzzing service may traverse all of the mapped code paths and mutate the inputs to trigger errors in the code. In some embodiments, this may be performed simultaneously with generation of input map data. Additionally, or alternatively, the targeted fuzzer may revisit the mapped code paths and alter its input mutations in order to trigger defects. For example, a generative analysis may only generate inputs for a particular portion of a code path until it finds inputs that reach the next portion of the code path. To identify defects, the targeted fuzzer may then expand on the initial inputs and continue generating inputs until a defect is identified or the range of inputs tested is exhausted or meets a predefined threshold.

At (9), the targeted fuzzing service 110 may report back any identified defects to the static code analyzer 108. Additionally, or alternatively, the targeted fuzzing service 110 may store the defects in defect storage 112 and report completion of the analysis. At (10), the static code analyzer 108 stores a report of identified defects in defect storage 112. In some embodiments, the defect report may comprise a list of identified defects and associated information, including the code paths associated with the defects, the nature and/or severity of defect, the version of the code in which the defect was detected, etc. In some embodiments, the static code analyzer 108 stores defects identified by static analysis as well as defects discovered by the targeted fuzzing service 110.

At (11), the static code analyzer reports the analysis results to the build service 106. In some embodiments, the analysis report may comprise a list of identified defects and associated information, including the code paths associated with the defects, the nature and/or severity of defect, the version of the code in which the defect was detected, etc. In some embodiments, the static code analyzer 108 stores defects identified by static analysis as well as defects discovered by the targeted fuzzing service 110. At (12), the build service 106 may then determine whether to issue a build of the code based on the analysis results. In some embodiments, this may comprise a determination that there are no defects over a threshold severity, and/or that there are no reported defects discovered through static analysis that were corroborated by the targeted fuzzing service 110. For example, an analysis report may indicate that the code analyzed contained a possible buffer overflow bug based on static analysis of the source code, but the targeted fuzzing service determined that the buffer overflow could not be triggered by user input; in this case the bug may be determined to be a false positive and the build service 106 may issue a build.

At (13), the build service 106 updates the build dashboard 114 with the build result. In some embodiments, this may include information about any defects discovered, including code paths and/or line numbers of source code associated with the defects. At (14), the build dashboard 114 pushes a notification to the software developer 102 indicating the build status. For example, the dashboard may push a notification that the code update was accepted and resulted in a successful build, or it may indicate that the build was unsuccessful, and present a list of defects that the software developer 102 must remedy before a successful build can be generated.

Example Updated Code Analysis

Figure 3:
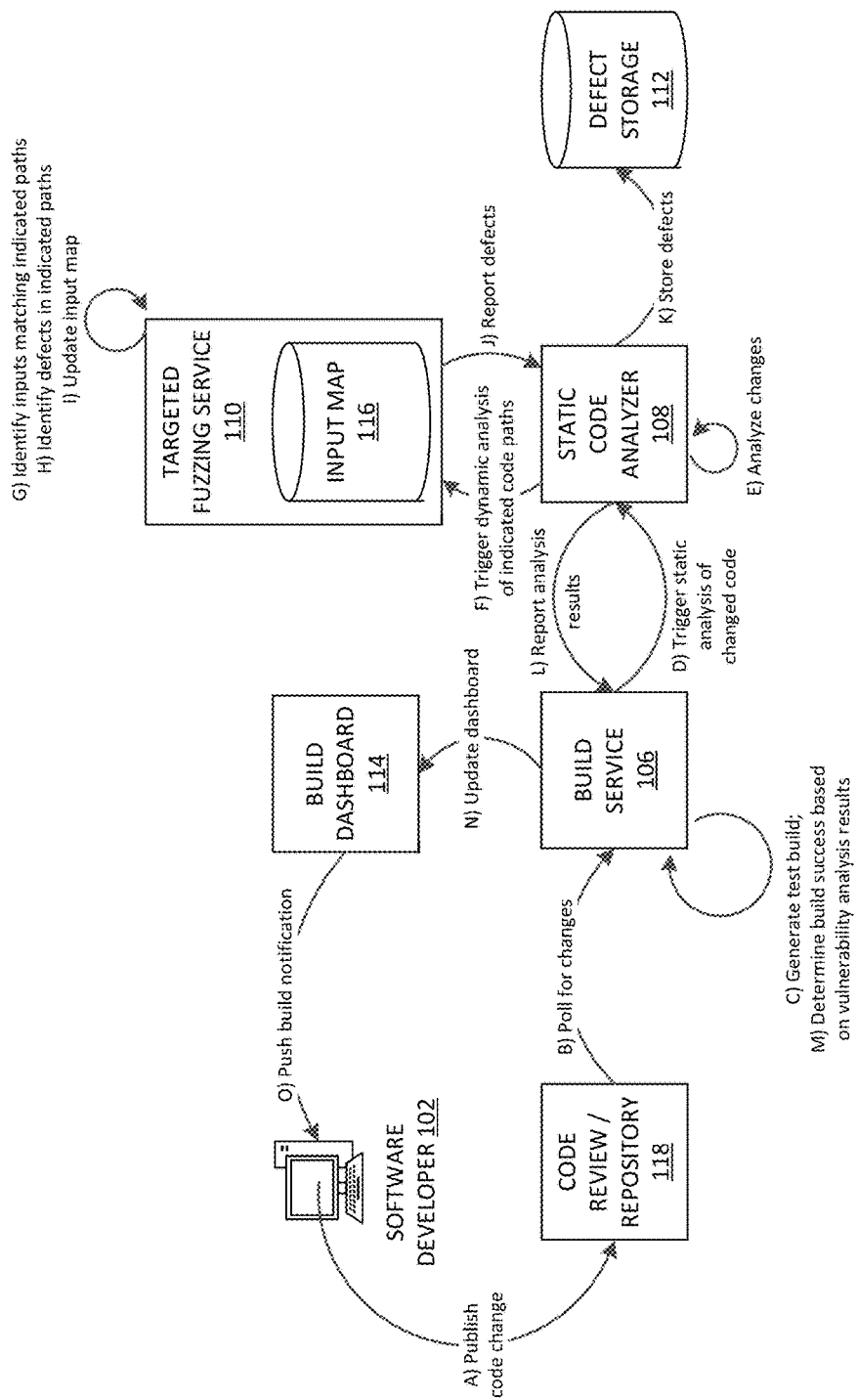
FIG. 3 is a block diagram of illustrative data flows and interactions between components of an example system for providing guided dynamic analysis using the results of static analysis of a code update.

FIG. 3 depicts illustrative interactions for performing an analysis of a change to an existing code base, including utilization of an input map by a targeted fuzzing service. The interactions begin at (A), where a software developer 102 publishes a code change to code review and repository module 118. As in FIG. 2. above, the build service 106 polls the code review and repository module 118 to discover the code change at (B), generates a test build at (C), and triggers a static analysis of the code at (D).

At (E), the static code analyzer 108 analyzes the code for defects. In some embodiments, the static code analyzer may analyze the entirety of the codebase, including the changes to the code. Alternatively, the static code analyzer may analyze only the portions of code that have changed. In these embodiments, the static code analyzer may receive only the portions of code that have changed. For example, source code may be "diffed" to generate a differential that represents the portions changed or added. The differential or "diff" may be provided to the static code analyzer 108. Additionally, in some embodiments executable code may be analyzed to detect logical differences between versions. In these embodiments, the static code analyzer 108 may receive binary executable codes corresponding to two versions of the source code, and may trace the execution paths of the executable codes to identify new or changed paths. Alternatively, the build service 106 may perform the differential analysis of executable codes and provide the static code analyzer 108 with data indicating which execution paths in the executable code have been altered or added.

At (F), the static code analyzer triggers a dynamic analysis of particular code paths. In some embodiments, the particular code paths may comprise code paths affected by the changed code. For example, a single function changed by an update may be reused in several places within the code, and each path calling the function may be indicated for testing. Additionally, or alternatively, the particular code paths may comprise code paths associated with defects discovered by the static code analyzer 108. For example, a code change may comprise a plurality of changed functions only one of which is identified as containing a potential code defect, and the targeted fuzzing service may analyze only the code paths referencing the code associated with the defect.

At (G), the targeted fuzzing service identifies, from the input map, inputs associated with the code paths indicated as requiring analysis, as described in more detail below. In some embodiments the code paths may comprise execution paths of an executable code. Additionally, or alternatively, the code paths indicated may be code paths of a source code corresponding to an executable code. In these embodiments, the targeted fuzzing service 110 may analyze the executable code and the source code to identify execution paths corresponding to the code paths of the source code. In some embodiments, an indicated code path may not have a precisely matching input. In these embodiments, the targeted fuzzing service may be able to match a portion of the code path to an existing input, and may select the input as a basis for generating further inputs to reach the code path. For example, function C may have been added to a program so that it can be called from function B, which is called from function A; the targeted fuzzer will be unable to identify inputs that cause execution to reach function C, but it may be able to identify inputs that cause execution of functions A and B, and use those inputs as the basis for generating new inputs to reach function C. In some embodiments, there may be no existing input map or other guidance data. In these embodiments, the fuzzer may be used to generate, using either the changed code or the prior code, an input map prior to identifying inputs that correspond to the targeted code paths.

At (H), the targeted fuzzing service 110 analyzes the executable code to identify defects in the indicated code paths. In some embodiments, this may require the targeted fuzzing service 110 to generate additional inputs to cause execution of the indicated paths. In these embodiments, the targeted fuzzing service 110 may keep track of the new inputs and the corresponding execution paths. Additionally, or alternatively, inputs that mapped to execution paths may no longer cause execution of those paths due to changes in the code, and the targeted fuzzing service may need to generate new inputs to the existing execution paths. At (I), the targeted fuzzing service 110 may update the input map 116 to store the newly discovered input mappings and their associated execution paths. At (J) the targeted fuzzing service may report the defects to the static code analyzer 108.

As in FIG. 2 above, the static code analyzer may store the identified defects in defect storage 112 at (K), and then report the analysis results to build service 106 at (L). At (M), the build service 106 may determine build success based on the analysis results, and update the build dashboard 114 at (N). At (O), the build dashboard 114 may push a notification to the software developer 102.

Example Generation and Reference of an Input Map

Figure 4:
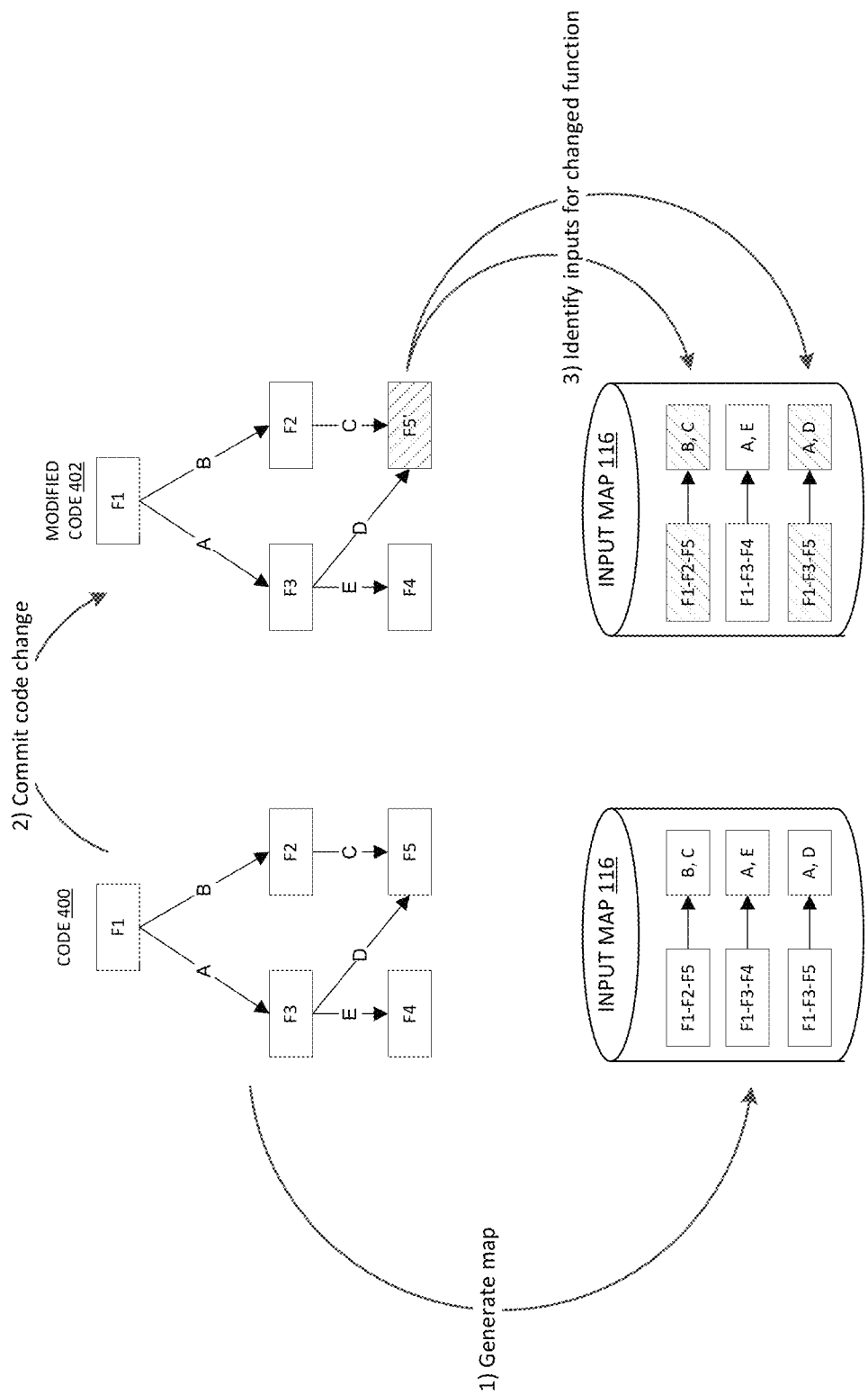
FIG. 4 is a block diagram of illustrative data flows and interactions between components of a targeted fuzzing service to generate and reference mappings of code execution paths.

FIG. 4 shows an illustrative example of generating and using guidance data including an input map associated with an executable code. As shown in FIG. 4, code 400 represents a code containing a series of functions F1-F5. Illustratively, arrows are shown between the function blocks labeled to show the inputs that cause execution to flow from one function to the next. At (1), an input map is generated corresponding to code 400 and stored in input map 116. Illustratively, each execution path represented by transitions between function blocks may be stored in input map 116 in addition to the inputs that cause each path's execution. For example, the execution path ending at function F4 may be represented as F1-F3-F4, and the associated inputs causing execution of that execution path may be represented by the sequence A, E, and they may be stored together as a pair in input map 116. In some embodiments, the execution paths stored in input map 116 may be execution paths of an executable code. Additionally, the executable code may also be a source code. For example, python source code is also executable by a python interpreter, so that an execution path and a code path of the source code will be identical.

At (2), a code change may alter code 400 to produce modified code 402. For example, function F5 may be changed by a code commit, with the resulting function illustratively shown as F5' in modified code 402. It may be desirable to analyze the changed code to identify whether any defects have been produced. To facilitate dynamic analysis, at (3) the input map 116 is referenced to identify inputs corresponding to execution paths that are known to include the changed function. Illustratively, F5' may be reached by execution path F1-F2-F5 or by F1-F3-F5, by using inputs B, C or A, D, respectively. With the identified inputs, a targeted fuzzing service 110 may be able to begin testing the changed code directly without having to generate new inputs. In some embodiments, the changed code may create new execution paths that are explored by the targeted fuzzing service 110. In these embodiments, any inputs generated to reach the new execution paths may be stored in input map 116.

In some embodiments, guidance data may include information in addition to, or instead of, an input map 116 that maps inputs to execution paths. Guidance data may include other information regarding the input paths that can be used to restrict the control flow of the targeted fuzzing service 110. For example, guidance data generated during a given execution of the targeted fuzzing service 110 may indicate relationships (or the lack thereof) among functions in the code. With reference to the execution paths illustrated in FIG. 4, guidance data may indicate that additional functions may be executed subsequent to function F4 in various execution paths. However, once function F4 is reached in any given execution path, function F5 is never reached. Thus, if the targeted fuzzing service 110 is being used to examine the effect of the change in function F5' using additional inputs that potentially lead to execution of new/different execution paths, the targeted fuzzing service 110 can stop exploring a given execution path once function F4 is reached.

The examples of guidance data described herein are illustrative only, and are not intended to be limiting, required, or exhaustive. In some embodiments, additional and/or alternative types or forms of guidance data may be generated and used to restrict the control flow of the targeted fuzzing service 110 to particular execution paths and other code portions.

Example Code Analysis Routine

Figure 5:
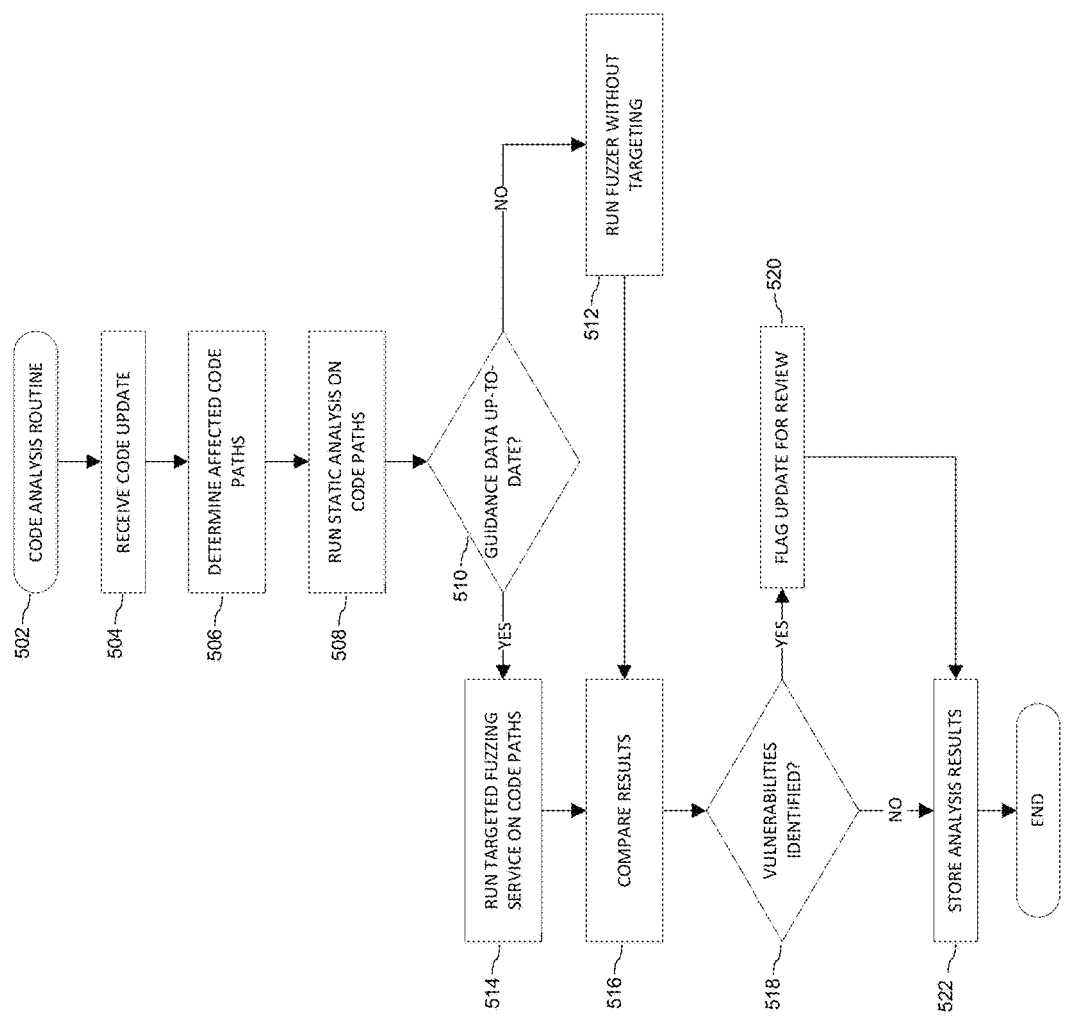
FIG. 5 is a flow diagram of an illustrative process for analyzing a code update according to some embodiments of the present disclosure.

FIG. 5 depicts an illustrative routine 502 for performing a code analysis, including analyzing of an updated code. The routine 502 may be implemented, for example, by a continuous integration and deployment (CICD) pipeline 124 of FIG. 1. In one embodiment, the routine may be executed by a computing system hosting a GIT repository connected to a Jenkins service configured to automatically analyze code changes and prepare test builds in preparation for deployment.

The routine 502 begins at block 504, where the system receives a code update. In some embodiments, this may correspond to a build service 106 polling a code review and repository module 118. For example, a user may publish a source code update to a shared source code review and repository module connected to a continuous integration and deployment pipeline, and the build service of the pipeline may identify the update and begin a build process. In some embodiments, this may include compiling the source code to generate an executable code.

At block 506, the system determines code paths affected by the update. In some embodiments, these may be code paths of a source code. For example, a source code change may alter a single function that is called by or calls to multiple other functions; the static code analyzer 108 may analyze the source code to identify these related functions and construct code paths containing the affected function. Additionally, or alternatively, the code paths may be execution paths of a corresponding executable code. In these embodiments, a component of the build pipeline, such as build service 106, or static code analyzer 108, may perform further analysis to identify the execution paths affected by the code change. For example, the static code analyzer 108 may receive a test build of executable code reflecting the current source code under review, and a copy of a previous build corresponding to the prior version of the source code. The static code analyzer 108 may perform a programmatic comparison of the two executable codes to identify which portions of the program logic have changed, and identify the execution paths that contain the changed code.

At block 508, the code is subjected to static analysis to identify potential code defects. In some embodiments, the analysis may be limited to the previously determined code paths affected by the change. Additionally, or alternatively, some embodiments may analyze the entirety of the current version of the code base (e.g., including recent changes), and compare results of this analysis to an analysis of the entirety of the prior version of the code base (e.g., before the recent changes). Any differences in the analysis results (e.g., any new defects identified in the current version that were not present in the prior version) can be attributed to the recent changes to the code.

Identified defects may be associated with the code paths containing the potential defects, as well as other information such as defect severity, the version of the code containing the defects, etc. The code analyzed may further comprise an executable code generated from a source code. In these embodiments, the defects may be identified with code paths of a source code corresponding to the executable, where the code paths correspond to execution paths associated with the defects.

At block 510, the system determines whether up-to-date guidance data exists for the executable code. In some embodiments, this may include querying an input map associated with a targeted fuzzing service to determine whether affected code paths have been previously analyzed. In some embodiments, existing guidance data may be not be considered up to date if a threshold number of changes have been made to the code since the guidance data was generated. For example, the system may be configured to disregard or regenerate existing guidance data when code changes affect 10% of the code.

At block 512, a targeted fuzzing service is used to analyze the code without necessarily targeting specific execution paths (e.g., without guidance data). In some embodiments, this may be performed if the code has never been analyzed by a fuzzer. Additionally, or alternatively, the fuzzer may be run without guidance data when it is determined that the guidance data is not up-to-date, as described above. In some embodiments, the fuzzer may generate guidance data for future use as it analyzes the code.

Although not illustrated in FIG. 5, in some embodiments decision block 510 and block 512 may be executed earlier in routine 502 instead of, or in addition to, after block 508. For example, the targeted fuzzing service may analyze the current version of the code in parallel with static code analysis, such as when there is no guidance data for targeting fuzzing, or when more than a threshold portion of the code has changed.

At block 514, a targeted fuzzing service is used to analyze the affected code paths. In some embodiments, the targeted fuzzing service may be provided with execution paths to target. Alternatively, the targeted fuzzing service may be provided with code paths of a source code corresponding to the executable code, and may perform further processing to identify the execution paths corresponding to the provided code paths.

In some embodiments, in order to target the affected execution paths, the targeted fuzzing service may be configured to retrieve guidance data from an input mapping, in the form of inputs associated with the affected execution paths. As shown in FIG. 4, above, initial generation of an input mapping may allow the targeted fuzzing service to directly execute affected execution paths by referencing previously generated input sequences known to cause execution of particular paths. For example, a targeted fuzzing service may be instructed to analyze a code segment that is reachable via a code path for which it has a mapped input sequence. The targeted fuzzing service may retrieve the input sequence and use it to cause execution of the code path up to the indicated code segment. From there, targeted fuzzing service may further generate additional inputs using the stored input sequence as a seed to test the code segment from the affected path. In some embodiments, the targeted fuzzing service may further repeat this process to test the execution of the code segment from a plurality of code paths.

In some embodiments, code changes may add new execution paths or alter existing execution paths. In these embodiments, the targeted fuzzing service may perform further processing to identify inputs that cover part of the new or changed execution paths, and use these as a basis to generate new inputs during analysis. For example, a function chain of A-B-C, may be altered by a code change to one of A-B-D; the targeted fuzzing service may then look up the input mapping for A-B-C and use the portion of the input mapping corresponding to A-B and use it as the basis to generate new inputs to execute function D. In some embodiments, the targeted fuzzing service may be configured to analyze the execution of the executable code to identify specific defects. Additionally, or alternatively, the targeted fuzzing service may be configured to attempt to cause a crash or error condition in the executable code. In these embodiments, the targeted fuzzing service may collect crash- or error-related information in addition to identifying specific defects.

At block 516, the CICD pipeline 124 may compare the results of the static and targeted fuzzing analyses. In some embodiments, a build service 106 may be configured to perform a comparison. In these embodiments, potential defects identified at block 508 may be compared to the results of the targeted fuzzing service's analysis in order to identify which potential defect is corroborated by the targeted fuzzing. For example, a static code analyzer may alert on a potential security vulnerability in a targeted code path, and the targeted fuzzing service may indicate that it was able to cause a crash on that code path, corroborating the vulnerability.

In one embodiment, the build service may be configured to correlate defects identified by the static code analyzer and the targeted fuzzing service. For example, a static code analyzer may identify a security vulnerability in a particular function of the source code, and a targeted fuzzer may identify that a crash is associated with execution of a code path containing the source code function. The build service may identify that the function of the source code corresponds to the execution path, and mark the vulnerability as corroborated by an execution error. In another embodiment, the static code analyzer and the targeted fuzzing service may use a common format for identifying vulnerabilities, and the build service may be configured to compare the reported defects from both analyses to identify vulnerabilities sharing a common identifier and code path.

At block 518, the CICD pipeline 124 may determine whether vulnerabilities have been identified in the code. Additionally, or alternatively, the determination may be based on whether defects of a threshold severity have been identified. In some embodiments, the determination may be made by a build service 106. In these embodiments, the build service may be configurable to set the threshold of severity of a vulnerability. In these embodiments, the build service 106 may be further configurable to ignore certain vulnerabilities detected by static analysis if they are not corroborated by the targeted fuzzing service. For example, a static analyzer may be found to generate a large number of false positives for a certain class of vulnerabilities, and the build service 106 may be configured to ignore that class of vulnerabilities unless a targeted fuzzing service is able to induce a crash or other error on a code path associated with the vulnerabilities. For example, use of an "unsafe" function may be acceptable where the function doesn't receive user input. A build service 106 may be configured to ignore defect reports from the static code analyzer reporting use of the unsafe function unless the targeted fuzzing service indicates it was able to cause execution of the function with user input. If the build service 106 determines that the code contains vulnerabilities meeting its threshold conditions, the routine proceeds to block 516.

At block 520, the code update is flagged for review. In some embodiments, this may require a software developer 102 to submit a further code change eliminating identified vulnerabilities or defects before the code change is accepted. Additionally, or alternatively, in some embodiments a software developer 102 may be able to interact with the CICD pipeline 124 via a build dashboard 114 to manually review the identified vulnerabilities. In these embodiments, the developer may be able to flag or mark an identified defect as a false positive and force acceptance of the code change. For example, a developer may review a defect indicating a failure to validate input on a function that cannot receive input from a user, and mark the defect as a false positive. The build dashboard 114 may be further configurable to prevent flagging of identified defects as false positives based on certain conditions, such as whether the defect was corroborated by the targeted fuzzing service, or whether the defect has a high severity rating. For example, a corroborated buffer overflow vulnerability may be made non-flaggable so that developers cannot force acceptance of code containing that vulnerability.

At block 522, the analysis results are stored in defect storage 112. In some embodiments, a defect marked as a false positive by a software developer 112 may be identified in defect storage 112 as a false positive to prevent it from interfering with future builds.

Example Static Code Analyzer

Figure 6:
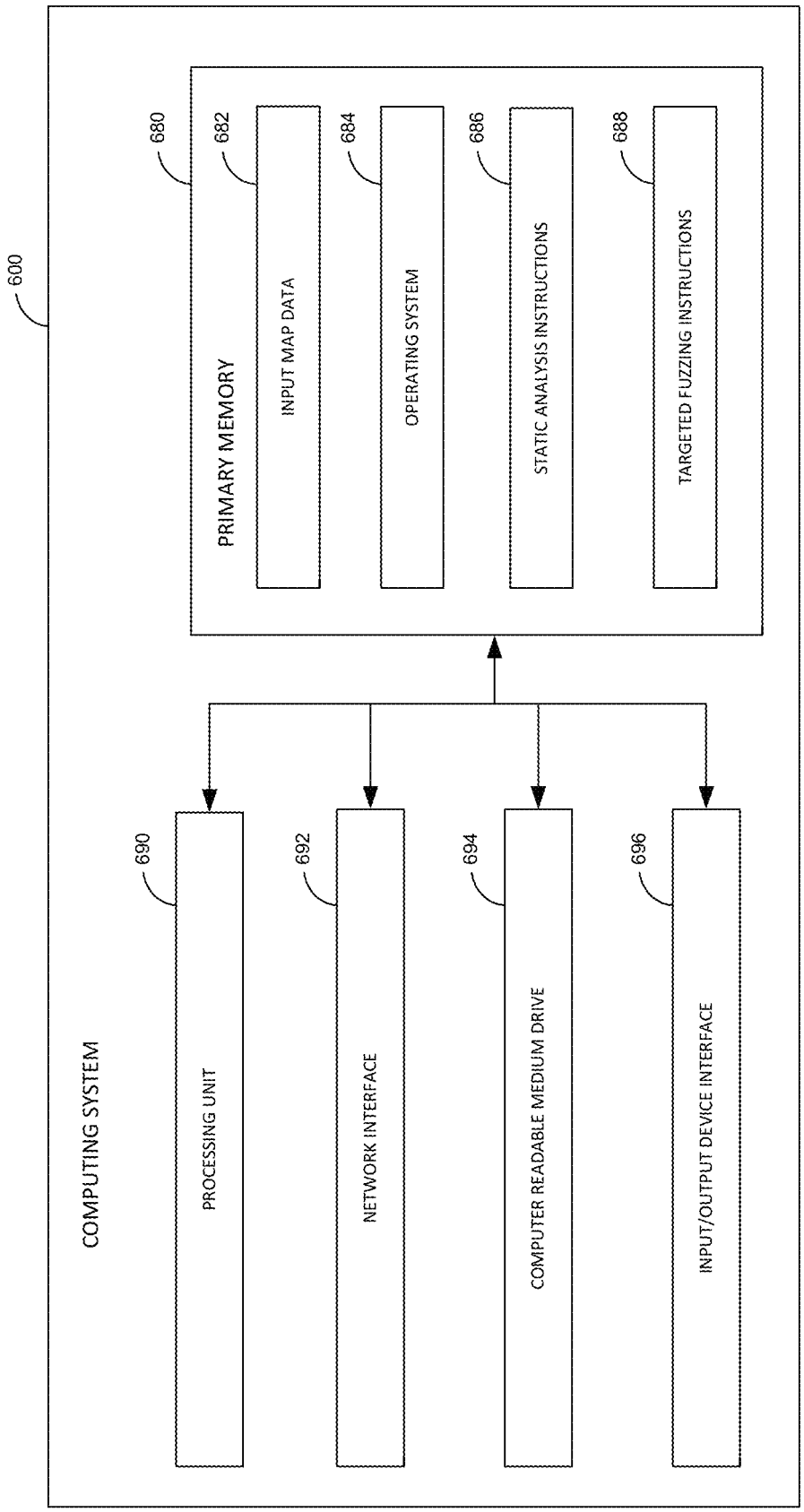
FIG. 6 is a block diagram of an illustrative computing device configured to implement features of a guided dynamic code analysis system in accordance with some embodiments of the present disclosure.

FIG. 6 depicts a general architecture of a computing system 600 that can perform any or all of the functions of the static code analyzer, the targeted fuzzer, etc. The general architecture of the computing system 600 depicted in FIG. 6 includes an arrangement of computer hardware and software modules that may be used to implement aspects of the present disclosure. The hardware modules may be implemented with physical electronic devices, as discussed in greater detail below. The computing system 600 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1. As illustrated, the computing system 600 includes a processing unit 690, a network interface 692, a computer readable medium drive 694, and an input/output device interface 696, all of which may communicate with one another by way of a communication bus. The network interface 692 may provide connectivity to one or more networks or computing systems. The processing unit 690 may thus receive information and instructions from other computing systems or services via a network. The processing unit 690 may also communicate to and from memory 680 and further provide output information for an optional display (not shown) via the input/output device interface 696. The input/output device interface 696 may also accept input from an optional input device (not shown).

The memory 680 may contain computer program instructions (grouped as modules in some embodiments) that the processing unit 690 executes in order to implement one or more aspects of the present disclosure. The memory 680 generally includes random access memory (RAM), read only memory (ROM) and/or other persistent, auxiliary or non-transitory computer readable media. The memory 680 may store an operating system 684 that provides computer program instructions for use by the processing unit 690 in the general administration and operation of the computing system 600. The memory 680 may further include computer program instructions and other information for implementing aspects of the present disclosure. For example, in one embodiment, the memory 680 includes targeted fuzzing instructions 688 that may be executed by the computing system in performing the functions of a targeted fuzzing service, input map data 682 that stores input maps generated by execution of the targeted fuzzing instructions, static analysis instructions 686 that may be executed by the computing system to perform static analyses of code, and an operating system 684. In addition, the memory 680 may include and/or communicate with one or more data repositories (not shown), for example, to access user program codes and/or libraries.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:

under control of a computing system comprising one or more computer processors configured to execute specific instructions, executing a static code analysis to generate a static analysis output indicating at least (1) a set of code defects in a source code segment, and (2) a set of source code paths of the source code segment associated with the set of code defects;

generating an executable code segment from the source code segment;

determining a set of execution paths of the executable code segment associated with the static analysis output based at least partly on the set of source code paths of the source code segment associated with the set of code defects;

obtaining guidance data regarding execution of the set of execution paths of the executable code segment by a fuzzer, wherein the guidance data is generated by executing a dynamic code analysis on the set of execution paths of the executable code segment associated with the static analysis output, and wherein the guidance data indicates relationships among a plurality of functions in the source code segment;

executing a subset of the set of execution paths of the executable code segment using the fuzzer and the guidance data, wherein the subset is determined based on the guidance data;

identifying a corroborated subset of the set of code defects based at least partly on results of executing the subset of the set of execution paths of the executable code segment using the fuzzer; and generating code analysis results based at least partly on the corroborated subset of the set of code defects.

2. The computer-implemented method of claim 1, wherein generating the code analysis results comprises generating an indication of whether an error occurred during execution of an executable code path of the executable code segment using the fuzzer.

3. The computer-implemented method of claim 1, wherein identifying the set of code defects comprises identifying at least one security vulnerability in the source code segment.

4. The computer-implemented method of claim 1, wherein obtaining the guidance data further comprises generating an input map using the fuzzer, wherein the input map comprises a set of execution inputs, and wherein a first execution input of the set of execution inputs is associated with a first execution path of the set of execution paths.

5. The computer-implemented method of claim 4, further comprising:

receiving a second source code segment, wherein the second source code segment comprises a modified version of the source code segment;

generating a second executable code segment from the second source code segment;

determining a second execution path of the second executable code segment that corresponds to a modification of the first execution path;

selecting the first execution input from the input map based at least partly on the second execution path corresponding to the modification of the first execution path; and executing, using the fuzzer, the second executable code segment with the first execution input.

6. The computer-implemented method of claim 5, further comprising generating a differential of the source code segment and the second source code segment, wherein the differential comprises a set of execution paths present in the second source code segment that are not present in the source code segment, and wherein determining the second execution path of the second executable code segment is based on the differential.

7. The computer-implemented method of claim 5, further comprising generating a differential of the executable code segment and the second executable code segment, wherein the differential comprises a set of execution paths present in the second executable code segment that are not present in the executable code segment, and wherein determining the second execution path of the second executable code segment is based on the differential.

8. The computer-implemented method of claim 1, further comprising determining that a first execution path of the set of execution paths is associated with a code defect, wherein identifying the corroborated subset of the set of code defects is based at least partly on the first execution path being associated with the code defect.

9. The computer-implemented method of claim 1, further comprising analyzing the guidance data to determine when to stop executing a first execution path of the set of execution paths.

10. A system comprising:

computer-readable storage storing executable instructions; and one or more hardware processors in communication with the computer-readable storage and programmed by the executable instructions to:

execute a static code analysis to generate a static analysis output indicating at least (1) a set of code defects in a source code segment, and (2) a set of source code paths of the source code segment associated with the set of code defects;

generate an executable code segment from the source code segment;

determine a set of execution paths of the executable code segment associated with the static analysis output based at least partly on the set of source code paths of the source code segment associated with the set of code defects;

obtain guidance data regarding execution of the set of execution paths of the executable code segment by a fuzzer, wherein the guidance data is generated by executing a dynamic code analysis on the set of execution paths of the executable code segment associated with the static analysis output, and wherein the guidance data indicates relationships among a plurality of functions in the source code segment;

execute a subset of the set of execution paths of the executable code segment using the fuzzer and the guidance data, wherein the subset is determined based on the guidance data;

identify a corroborated subset of the set of code defects based at least partly on results of executing the subset of the set of execution paths of the executable code segment using the fuzzer; and generate code analysis results based at least partly on the corroborated subset of the set of code defects.

11. The system of claim 10, wherein to generate the code analysis results, the one or more hardware processors are further programmed by the executable instructions to generate an indication of whether an error occurred during execution of an executable code path of the executable code segment using the fuzzer.

12. The system of claim 10, wherein to identify the set of code defects, the one or more hardware processors are further programmed by the executable instructions to identify at least one security vulnerability in the source code segment.

13. The system of claim 10, wherein to obtain the guidance data, the one or more hardware processors are further programmed by the executable instructions to generate an input map using the fuzzer, wherein the input map comprises a set of execution inputs, and wherein a first execution input of the set of execution inputs is associated with a first execution path of the set of execution paths.

14. The system of claim 13, wherein the one or more hardware processors are further programmed by the executable instructions to:
receive a second source code segment, wherein the second source code segment comprises a modified version of the source code segment;
generate a second executable code segment from the second source code segment;
determine a second execution path of the second executable code segment that corresponds to a modification of the first execution path;
select the first execution input from the input map based at least partly on the second execution path corresponding to the modification of the first execution path; and
execute, using the fuzzer, the second executable code segment with the first execution input.

15. The system of claim 14, wherein the one or more hardware processors are further programmed by the executable instructions to generate a differential of the source code segment and the second source code segment, wherein the differential comprises a set of execution paths present in the second source code segment that are not present in the source code segment, and wherein determining the second execution path of the second executable code segment is based on the differential.

16. The system of claim 14, wherein the one or more hardware processors are further programmed by the executable instructions to generate a differential of the executable code segment and the second executable code segment, wherein the differential comprises a set of execution paths present in the second executable code segment that are not present in the executable code segment, and wherein determining the second execution path of the second executable code segment is based on the differential.

17. The system of claim 10, wherein the one or more hardware processors are further programmed by the executable instructions to determine that a first execution path of the set of execution paths is associated with a code defect, wherein identifying the corroborated subset of the set of code defects is based at least partly on the first execution path being associated with the code defect.

18. The system of claim 10, wherein the one or more hardware processors are further programmed by the executable instructions to analyze the guidance data to determine when to stop executing a first execution path of the set of execution paths.

19. Non-transitory computer-readable storage having stored thereon executable instructions configured to cause a computing device to at least:
execute a static code analysis to generate a static analysis output indicating at least (1) a set of code defects in a source code segment, and (2) a set of source code paths of the source code segment associated with the set of code defects;
generate an executable code segment from the source code segment;
determine a set of execution paths of the executable code segment associated with the static analysis output based at least partly on the set of source code paths of the source code segment associated with the set of code defects;
obtain guidance data regarding execution of the set of execution paths of the executable code segment by a fuzzer, wherein the guidance data is generated by executing a dynamic code analysis on the set of execution paths of the executable code segment associated with the static analysis output, and wherein the guidance data indicates relationships among a plurality of functions in the source code segment;
execute a subset of the set of execution paths of the executable code segment using the fuzzer and the guidance data, wherein the subset is determined based on the guidance data;
identify a corroborated subset of the set of code defects based at least partly on results of executing the subset of the set of execution paths of the executable code segment using the fuzzer; and
generate code analysis results based at least partly on the corroborated subset of the set of code defects.

20. The non-transitory computer-readable storage of claim 19, wherein the executable instructions are further configured to cause the computing device to:
generate an input map using the fuzzer, wherein the input map comprises a set of execution inputs, and wherein a first execution input of the set of execution inputs is associated with a first execution path of the set of execution paths;
receive a second source code segment, wherein the second source code segment comprises a modified version of the source code segment;
generate a second executable code segment from the second source code segment;
generate a differential comprising a set of execution paths present in the second source code segment that are not present in the source code segment; and
determine, based on the differential, a second execution path of the second executable code segment that corresponds to a modification of the first execution path.

* * * * *